United States Patent [19]

Emory, Jr.

[11] Patent Number: 4,495,721
[45] Date of Patent: Jan. 29, 1985

[54] ROD HOLDER ASSEMBLY

[75] Inventor: John E. Emory, Jr., Traverse City, Mich.

[73] Assignee: Big Jon, Inc., Traverse City, Mich.

[21] Appl. No.: 512,360

[22] Filed: Jul. 11, 1983

[51] Int. Cl.³ .............................................. A01K 97/10
[52] U.S. Cl. ........................................ 43/21.2; 43/15; 43/27.4
[58] Field of Search .................... 43/21.2, 15, 17, 27.4

[56] References Cited

U.S. PATENT DOCUMENTS

| | | | |
|---|---|---|---|
| 2,564,840 | 8/1951 | Glenn | 43/16 |
| 2,661,563 | 12/1953 | Adams, Jr. et al. | 43/16 |
| 2,713,741 | 7/1955 | Gnagy | 43/16 |
| 2,740,219 | 4/1956 | Harden | 43/16 |
| 2,744,351 | 5/1956 | Smith | 43/16 |
| 2,770,906 | 11/1956 | Hood | 43/16 |
| 2,783,575 | 3/1957 | Housel, Sr. | 43/16 |
| 2,786,296 | 3/1957 | Loebensteen | 43/43.12 |
| 2,908,099 | 10/1959 | Burke | 43/16 |
| 3,284,943 | 11/1966 | Wedel | 43/15 |
| 3,628,274 | 12/1971 | Wojahn | 43/43.12 |
| 3,881,269 | 5/1975 | Timmons | 43/21.2 |
| 3,977,118 | 8/1976 | Seymour | 43/21.2 |
| 4,012,861 | 3/1977 | Gellatly | 43/15 |
| 4,142,315 | 3/1979 | Hoffman | 43/15 |

Primary Examiner—Gene P. Crosby
Attorney, Agent, or Firm—Price, Heneveld, Huizenga & Cooper

[57] ABSTRACT

A rod holder assembly adapted for use with a downrigger includes a base having a mounting portion and a bifurcated upper portion which defines a slot. The base is adapted to be secured to the transom, gunwale or other portion of a boat. An elongated, tubular rod holder is pivotally supported within the slot by a pivot pin extending through the bifurcated upper portion of the base. A T-shaped spring bracket extends perpendicularly from the base. A pair of springs extend between the bracket and pivot arms secured to the pivot pin. The springs bias the fishing rod holder to a strike position pointing into the boat. The rod holder is held in a set position when the fishing line is attached to a downrigger line release against the bias of the springs.

16 Claims, 6 Drawing Figures

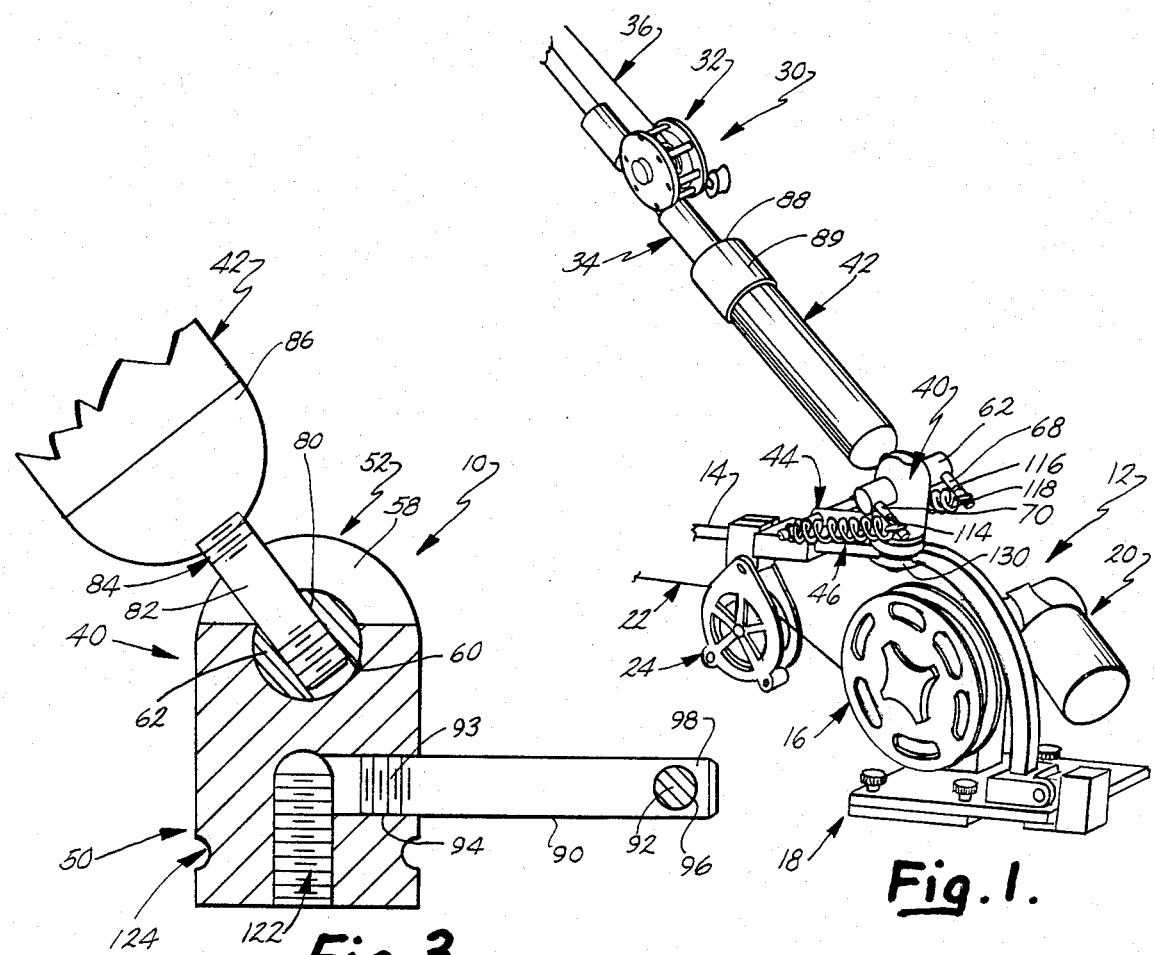
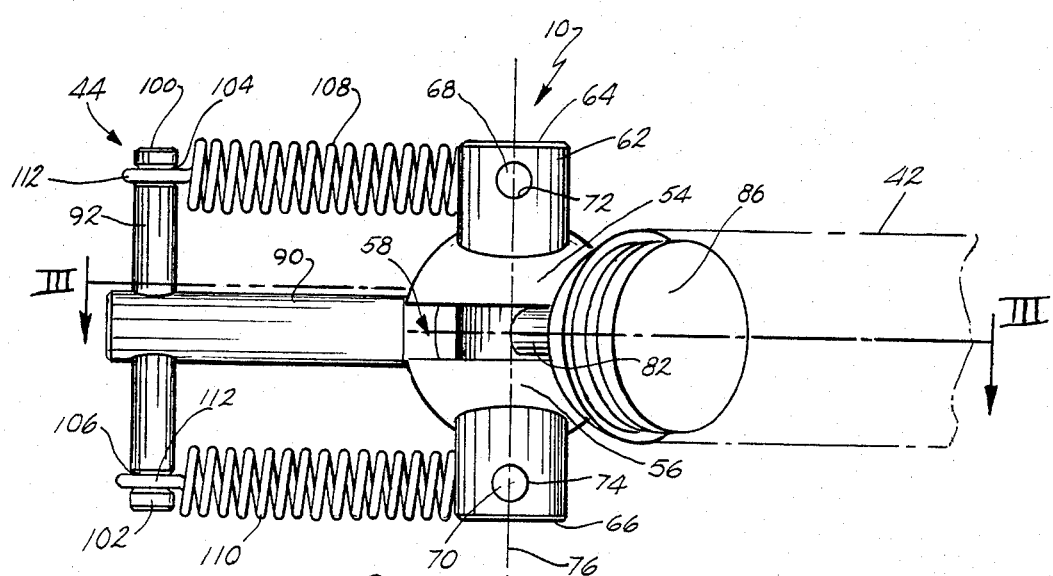

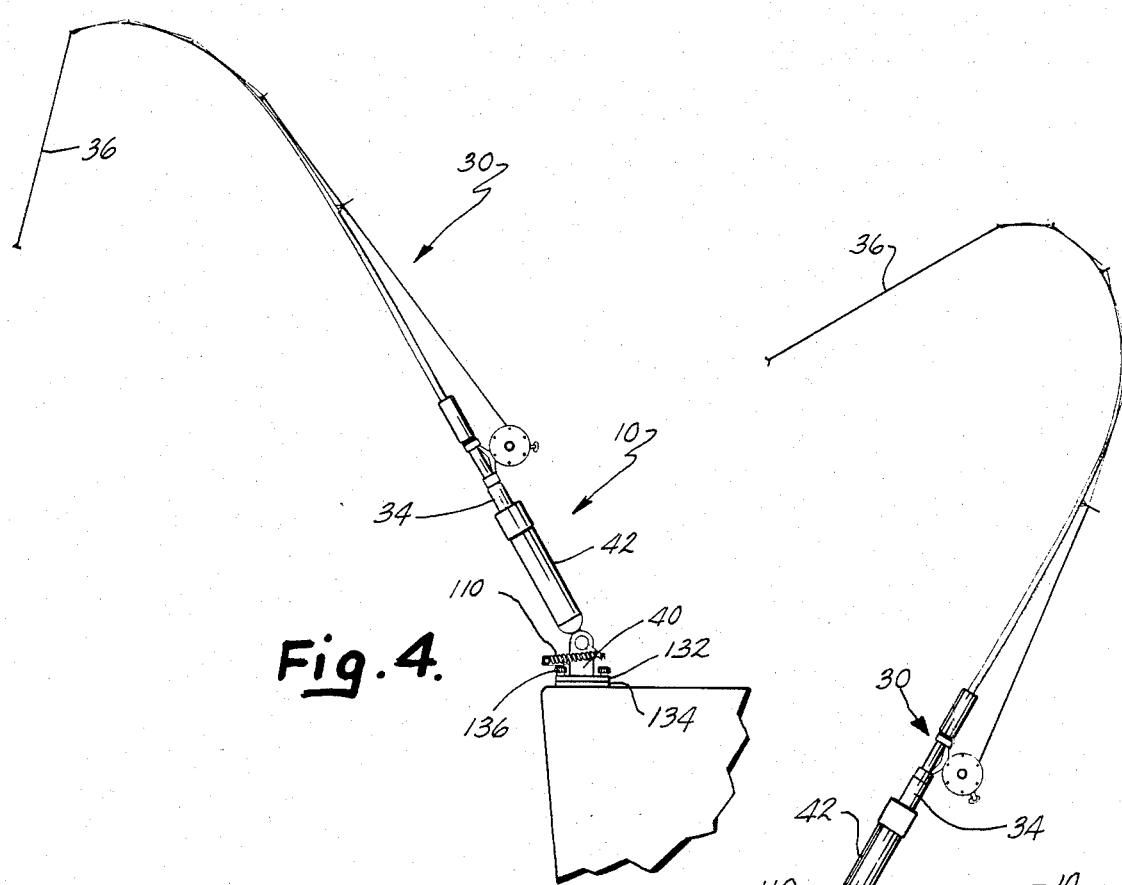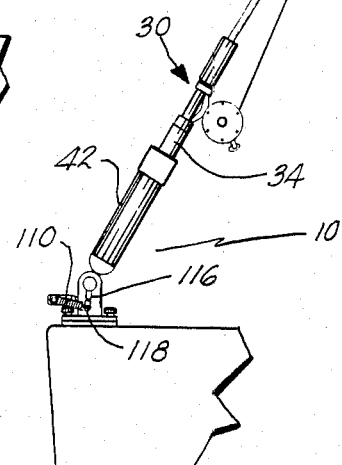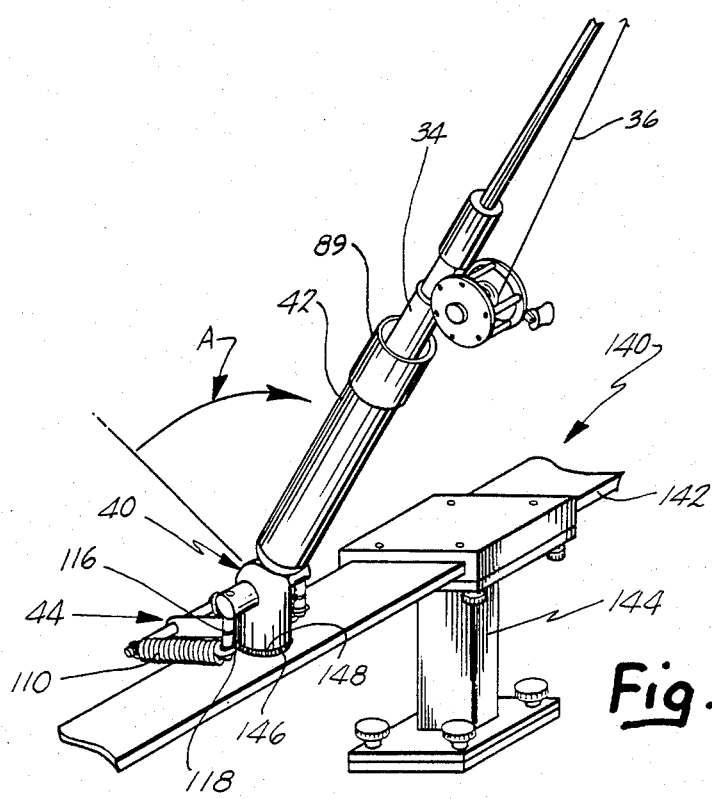

ROD HOLDER ASSEMBLY

BACKGROUND OF THE INVENTION

The present invention relates to fishing rod holders and more particularly to an improved holder adapted for use with a downrigger which is used to maintain the depth of a lure or bait attached to a fishing line.

Various systems have heretofore been proposed for ocean or lake trolling to maintain the lure or bait attached to a fishing line at a predetermined depth. Such systems include so-called downriggers. The downrigger includes a reel, a boom and a downrigger line. Secured to the end of the downrigger line is a weight. Also supported by the line is a fishing line release. The line from a fishing rod is secured to the release. The downrigger line and weight maintain the fishing line at a predetermined depth selected by the user. When the bait is struck by a fish, the line releases from the downrigger line. The fisherman must retrieve the pole and then reel in the fish. Examples of such downrigger systems and components therefor may be found in U.S. Pat. No. 3,977,118, entitled Fishing Rod Holder With Downrigger Attachments and issued on Aug. 31, 1976 to Seymour; U.S. Pat. No. 2,786,296, entitled Trolling Tackle and issued on Mar. 26, 1975 to Loebensteen; and commonly owned U.S. Pat. No. 4,173,091, entitled Downrigger Line Release and issued on Nov. 6, 1979 to Emory.

In using a downrigger device, the fishing rod may be supported on a suitable holder secured to the downrigger structure or it may be mounted to the gunwale or transom of the boat. The rod extends outwardly away from the boat. With such mounting methods, problems are experienced with retrieving the rod after a fish strikes the bait. Since the rod extends away from the fisherman, he has to lean outwardly over the gunwale or transom to remove the rod from the fishing rod holder. Also, in deep lake or ocean trolling, typically a plurality of rods are used at the same time. It is difficult for a fisherman to know precisely which rod has received the strike. Further, when line release occurs, there is slack in the fishing line which can result in fish loss.

Various forms of fishing rod holders have heretofore been proposed to reduce the fish loss and/or provide an indication of when the bait has been taken. These devices are typically fairly complicated and include some form of latch or detent mechanism which holds the fishing rod holder in a "set" position against the bias of a spring. Upon receiving a strike, the detent is released and the rod holder pivots to indicate a strike. These systems are not readily adapted or designed for use when trolling but are typically employed in stationary fishing situations. Examples of such spring-loaded holders may be found in U.S. Pat. No. 3,284,943, entitled Fish Snagging Fish Holder and issued on Nov. 15, 1966 to Wedel and U.S. Pat. No. 3,881,269, entitled Automatic Fishing Device and issued on May 6, 1975 to Timmons.

SUMMARY OF THE INVENTION

A need exists for a fishing rod holder which is adapted for use with a downrigger device and which will rotate the fishing rod into the boat for ease of retrieval upon a strike and by which the aforementioned problems are solved or substantially alleviated. In accordance with the present invention, a rod holder is provided including a base adapted to be secured to the gunwale or transom of a boat or directly mounted on a downrigger. The base defines a bifurcated upper end and a throughbore. A pivot rod or pin extends through the throughbore and a tubular holder is secured to the rod. The bifurcated upper end defines the limits of pivotal movement out of the holder. In the preferred form, a dual spring arrangement biases the pivot rod and holder to a "stike" position at which the holder pivots back into the boat. The dual springs insure that an essentially equal tension or moment arm is exerted on the pivot rod to prevent binding of the rod within the bore. This eliminates the need for separate bearings or bushings.

When the fishing line of a rod inserted into the holder is attached to a downrigger line release, the force exerted on the fishing line by the downrigger weight during trolling operations biases the holder out of the boat to a set position. Upon line release, the holder immediately pivots inwardly to take up slack in the line, thereby reducing fish loss. The rod is easily retrieved by the fisherman without the need to lean outwardly over the transom or gunwale of the boat. The holder also keeps tension on the fishing line until the fisherman can retrieve the rod or pole.

BRIEF DESCRIPTION OF THE DRAWINGS

FIG. 1 is a perspective view of a fishing rod holder in accordance with the present invention shown mounted on a downrigger;

FIG. 2 is a top, plan view of the fishing rod holder;

FIG. 3 is a cross-sectional view taken generally along line III—III of FIG. 2;

FIG. 4 is a fragmentary, side elevational view showing the rod holder in a set position and mounted on the transom of a boat;

FIG. 5 is a fragmentary, elevational view showing the rod holder in a "strike" position; and FIG. 6 is a perspective, fragmentary view showing the fishing rod holder mounted on a trolling bar assembly.

DETAILED DESCRIPTION OF THE PREFERRED EMBODIMENT

A preferred embodiment of a fishing rod holder assembly in accordance with the present invention is illustrated in FIGS. 1, 2 and 3 and generally designated 10. As seen in FIG. 1, assembly 10 may be secured to a downrigger generally designated 12. Downrigger 12 is a commercially available device which includes a boom 14, a reel 16, a mounting plate 18 and an electric motor 20. A downrigger line 22 extends from the reel over a pulley 24. Motor 20 rotates the reel 16 to pay out or take in the downrigger line. Attached to downrigger line 22 in a conventional fashion is a downrigger weight (not shown). Also attached to the downrigger line is a fishing line release device (not shown). These are conventional items. A fishing rod and reel combination 30 is supported by assembly 10. A reel 32 mounted on the rod adjacent a handle 34 contains a fishing line 36. Fishing line 36 is releasably secured to the downrigger line release, as is shown in aforementioned U.S. Pat. No. 4,173,091.

Holder assembly 10 includes a cylindrical or tubular base 40, a barrel or rod holder member 42, a spring bracket 44 and spring means generally designated 46. As best seen in FIGS. 2 and 3, base 40 is a generally cylindrical member having a lower mounting portion 50 and a bifurcated, upper portion 52. Upper portion 52 defines a pair of spaced, parallel, opposed legs 54, 56 and an arcuate slot 58. Upper portion 52 of base 40 further defines a throughbore 60. Throughbore 60 opens through both legs 54, 56. Rotatably supported in throughbore 60 is a pivot rod or pin 62. As best seen in FIG. 2, pin 62 extends outwardly and equidistant from legs 54 and 56. Secured to pin 62 adjacent ends 64, 66 are pivot arms or legs 68, 70, respectively. Arms 68, 70 are press-fitted into bores 72, 74 defined by pin 62. Arms 68, 70 extend perpendicular to a longitudinal axis 76 of pin 62. As is apparent from FIG. 2, pin 62 extends transversely or perpendicular to legs 54, 56 of base 40.

As seen in FIGS. 2 and 3, pivot rod or pin 62 defines a threaded bore 80. Bore 80 is intermediate or centrally positioned with respect to ends 64, 66. Bore 80 extends at an angle of approximately 140° with respect to the plane of legs 68, 70. Threaded within bore 80 is a holder support pin 82. Secured at an end 84 of support 82 is holder member 42.

Holder member 42 is an elongated, cylindrical member closed at a lower end by a base 86 to which support 82 is threadably secured. Holder member 42 is open at opposite end 88 to receive rod holder 34. A protective covering 89 of suitable plastic material may be press-fitted or shrunk onto end 80 of holder member 42 to protect rod handle 34. Protective member 89 extends internally of member 42 to insure a snug fit between handle 34 and tubular member 42.

As best seen in FIGS. 2 and 3, bracket 44 is a generally T-shaped member in plan including a single leg 90 and a cross piece 92. Leg 90 includes a threaded end 93 threaded into a bore 94 defined by the lower portion 50 of base 40. Leg 90 extends perpendicular to piece 92 coincident with or in the same plane as slot 58 (FIG. 2). Cross piece 92 extends through a bore 96 defined by end 98 of leg 90. Free ends 100, 102 define grooves 104, 106, respectively. Extending between grooves 104, 106 and free ends of the pivot arms 68, 70 are coil springs 108, 110. Ends 112 of the springs are hooked over cross piece 92 in a respective one of the grooves 104, 106. Opposite ends 114 of springs 108, 110 (FIG. 1) are received within one of a pair of spaced, circumferential grooves 116, 118 defined by each of the pivot arms 68, 70. Positioning ends 114 of the springs in the lower grooves 118 increases the moment arm and hence the moment exerted on pivot pin 62 by springs 108, 110. Springs 108, 110 are identical. The dual spring arrangement exerts an essentially equal moment on pin 62 at equidistant points from the center thereof. This arrangement eliminates or significantly reduces the chance of pin 62 binding within bore 60 of base 40. The spring arrangement including the T-shaped spring bracket eliminates the need for a separate bushing or bearing arrangement within the bore.

Base 40 at lower portion 50 defines a central, coaxial threaded blind bore 122. Bore 122 extends vertically centrally of cylindrical or tubular base 40 and is part of the mounting structure for the holder, as explained in more detail below. Base portion 50 also defines a circumferential or peripheral groove 124 which is also part of the mounting structure.

In order to secure holder 10 to downrigger 12, as shown in FIG. 1, a mounting plate 130 is secured to base 40 by a threaded fastener extending into bore 122. Plate 130 clamps boom 14 to the undersurface of base 40.

In order to secure the holder to the transom of a boat, as shown in FIG. 5, a mounting plate 132 is secured to base 40 by a threaded fastener (not shown) extending into bore 122. Mounting plate 132 is secured to another plate 134 on the transom by thumb screws or bolts 136.

Base 40 is also readily adapted to use with a trolling bar assembly 140, as shown in FIG. 6. Trolling bar assembly 140 includes an elongated board 142 which extends transversely of a boat and is supported on adjustable stanchions 144. Board 142 defines a plurality of apertures 146. Base 40 is dimensioned to extend through aperture 146. A mounting plate is secured to the underside of base 40 by a fastener extending into bore 122. Base 40 is locked on board 142 by a garter spring 148 received within circumferential groove 124. In the alternative, base 40 may define a second, spaced groove to receive a second garter spring. This would eliminate the need for a plate. The trolling bar assembly and the garter spring mounting arrangement are described in detail in commonly owned, co-pending application Ser. No. 465,194, entitled Trolling bar assembly and filed on Feb. 9, 1983 by John E. Emory, Jr.

OPERATION

In operation, the fishing rod holder assembly is secured either to a downrigger or to the transom of a boat, as illustrated in FIG. 4, or to any other suitable mounting place on the boat reasonably adjacent a downrigger. Fishing rod 30 is positioned with rod handle 34 within tubular holder member 42. Fishing line 36 is secured to the downrigger line release in the conventional fashion. When the downrigger line is paid out to the predetermined depth desired by the fisherman and trolling commences, holder member 42 will be pivoted against the bias of springs 108, 110 to a "set" position, illustrated in FIG. 4. When fishing line 36 releases from the downrigger upon a strike, holder member 42 will rotate under the bias of springs 108, 110 back into the boat to a "strike" position, as illustrated in FIG. 5. Holder member 42 is limited to rotation through an angle A of approximately 90° due to contact of threaded pin 82 with the front and back portions of slot 58, as shown in FIGS. 3 and 6. When in the strike position, as shown in FIG. 5, the holder presents the fishing rod to the fisherman for ease of retrieval. The rotating action of the holder member 42 takes up slack in the line 36 upon release. This assists in setting the hook and reducing fish loss. Further, the holder provides a ready indication as to which rod has been struck and helps to maintain tension on the line 36 until the fisherman can retrieve the pole. The assembly is easy to use and reliable in operation. The elements of the assembly, such as the base, pivot pin, bracket and holder member, are easily fabricated from corrosion resistant metals.

The unique mounting means of the holder device in accordance with the present invention permits the base to be secured to or mounted at various positions on a boat. The base may be secured to a downrigger device, the transom, the gunwale and/or to a trolling bar assembly. The spring arrangement eliminates cross torque on the pivot pin or rod, thereby eliminating the need for a separate bearing or bushing element within the pivot bore. This also increases reliability.

In view of the foregoing description, various modifications to the present invention might be envisioned by those of ordinary skill in the art which would not depart from the inventive concepts disclosed herein. It is therefore expressly intended that the above description should be considered as that of the preferred embodiments only. The true spirit and scope of the present invention may be determined by reference to the appended claims.

The embodiments of the invention in which an exclusive property or privilege is claimed are defined as follows:

1. A rod holder assembly primarily adapted for use with a downrigger to position a fishing rod having a line releasably secured to a downrigger line, said holder comprising:
   a base, said base having a mounting portion, a bifurcated upper portion defining a slot and a throughbore extending through said upper portion and transversely of said slot;
   a cylindricl rod holder member having an open end adapted to receive a fishing rod;
   a pivot pin extending through said bore in said bifurcated upper portion of said base, said rod holder being secured to said pivot pin within said slot;
   a bracket extending from said base; and
   spring means attached to said bracket for biasing said pivot pin and said holder to a strike position away from said bracket, said rod holder being movable from said strike position to a set position against the bias of said spring means.

2. A rod holder as defined by claim 1 wherein said bracket is generally T-shaped in plan and includes a cross piece and a leg, said leg extending perpendicular to said base.

3. A rod holder as defined by claim 2 wherein said spring means includes a pair of pivot arms secured to said pivot pin.

4. A rod holder as defined by claim 3 wherein said spring means includes a pair of springs, each extending from said cross piece to one of said pivot arms.

5. A rod holder as defined by claim 4 wherein said slot opens through an angle of less than 180° to define the limits of pivotal movement of said rod holder.

6. A rod holder as defined by claim 5 wherein each of said springs are coil springs.

7. A rod holder as defined by claim 6 wherein each of said pivot arms defines a pair of spaced grooves, said grooves being attachment points for said springs so that the moment arm applied by said springs to said pivot pin may be varied.

8. A rod holder as defined by claim 1 wherein said mounting portion of said base defines a circumferential, peripherally extending groove.

9. A rod holder as defined by claim 8 wherein said mounting portion further defines a centrally positioned threaded bore and said holder assembly further includes a mounting plate threadably secured to said base at said threaded bore.

10. A rod holder as defined by claim 7 wherein said mounting portion of said base defines a circumferential, peripherally extending groove.

11. A rod holder as defined by claim 10 wherein said mounting portion further defines a centrally positioned threaded bore and said holder assembly further includes a mounting plate threadably secured to said base at said threaded bore.

12. In a rod holder with a barrel for holding a fishing rod, said barrel being pivotal about a base on a pivot from a first position to a second position, said holder having spring means biasing said barrel toward said second position, the improvement comprising:
   said pivot including a pivot rod mounted in a horizontal bore in said base so as to prevent lateral movement of said pivot rod but to allow rotational movement of said pivot about its longitudinal axis, the ends of said pivot rod extending beyond said base;
   said barrel being secured to said pivot rod perpendicular to said pivot rod axis approximately intermediate the ends of said pivot rod, said base having an opening to permit said barrel to be secured to said pivot rod, said opening being sufficiently large so as to permit said barrel to pivot from said first position to said second position;
   a pair of pivot arms, each being secured adjacent an end of said pivot rod and projecting perpendicularly thereform;
   bracket means secured to said mounting means; and
   said spring means secured at one end to said bracket means and at the other end to each of said arms for biasing said rod and said barrel to said second position.

13. The fishing rod holder of claim 12 wherein said bracket means includes at least one horizontal spring arm extending therefrom.

14. The fishing rod holder of claim 12 wherein said bracket means includes two spring arms and said spring means includes a first spring extending between one of said spring arms and one of said pivot arms, and a second spring extending between the other of said spring arms and the other of said pivot arms.

15. The fishing rod holder of claim 14 wherein said opening comprises an arcuate slot.

16. The fishing rod holder of claim 15 wherein said each of said pivot arms has first and second grooves for attachment of said springs, said grooves spaced longitudinally on said pivot arms such that the moment arm applied by said springs can be varied.

* * * * *